United States Patent [19]

O'Sullivan et al.

[11] Patent Number: 5,822,094
[45] Date of Patent: Oct. 13, 1998

[54] SELF-STIMULATION SIGNAL DETECTION IN AN OPTICAL TRANSMISSION SYSTEM

[75] Inventors: Maurice Stephen O'Sullivan, Ottawa; Kim Bryon Roberts, Kanata; James St. Leger Harley; Jeffrey Alan Weslowski, both of Ottawa, all of Canada

[73] Assignee: Northern Telecom Limited, Montreal, Canada

[21] Appl. No.: 924,095

[22] Filed: Sep. 5, 1997

Related U.S. Application Data

[63] Continuation of Ser. No. 588,176, Jan. 18, 1996.

[51] Int. Cl.$^6$ ......................................................... H04B 10/08
[52] U.S. Cl. ............................................. 359/110; 359/177
[58] Field of Search ................................. 359/110, 134, 359/160, 181, 177, 341

[56] References Cited

U.S. PATENT DOCUMENTS 5,513,029   4/1996   Roberts ................................... 359/177

FOREIGN PATENT DOCUMENTS

| 0 618 691 A1 | 10/1994 | European Pat. Off. ........ | H04B 10/08 |
| 2 268 852 | 1/1994 | United Kingdom ........... | H04B 10/08 |
| 2 278 230 | 11/1994 | United Kingdom ............ | H01S 3/131 |

OTHER PUBLICATIONS

*Electronics Letters*, vol. 29, No. 3, 4 Feb. 1993, pp. 255–256, XP000336779, Hirst I.J. et al., "Performance Monitoring of Long Chains of Optical Amplifiers".

*Patent Abstracts of Japan*, vol. 95, No. 006 & JP,A,07 154330 (NEC Corp), 16 Jun. 1995, Abstract.

"Coherent FMCW Reflectometry Using a Temperature Tuned Nd: YAG Ring Laser", W.V. Sorin et al, IEEE Photonics Technology Letters, vol. 2, No. 12, pp. 902–904, Dec. 1990.

"Frequency Domain Optical Reflectometer", R.I. MacDonald, Applied Optics, vol. 20, No. 10, pp. 1840–1844, May 1981.

"High Spatial Resolution OTDR Attenuation Measurements by a Correlation Technique", M. Zoboli et al, Applied Optics, vol. 22, No. 23, pp. 3680–3681, Dec. 1983.

*Primary Examiner*—Kinfe-Michael Negash
*Attorney, Agent, or Firm*—Aprilia U. Diaconescu

[57] ABSTRACT

In an apparatus and method for troubleshooting a transmission system comprising optical line amplifiers (OA), optical reflections can be detected irrespective if a data signal is present or absent. Each OA is equipped with a self-stimulation signal detection unit for generating a low frequency local code unique to the transmission system and dithering the outgoing signal in a controlled manner with the local code. Each OA attempts to detect its local code in the incoming signal by comparing the energy of the transmitted and received dithers. The presence of the local code in the incoming signal initiates alarms which unequivocally identify the faulted OA. Each OA selects its local code out of a bank of local codes, according to a priority scheme and re-selects its local code in case of conflicts.

19 Claims, 7 Drawing Sheets

SELF-STIMULATION SIGNAL DETECTION IN AN OPTICAL TRANSMISSION SYSTEM

This application is a continuation of application Ser. No. 08/588,176, filed Jan. 18, 1996 (pending).

FILED OF THE INVENTION

This invention relates to optical transmission systems and in particular to the provision of distinguishing a reflected amplified spontaneous emission condition (ASE) or oscillation from normal operation of the optical transmission system.

BACKGROUND OF THE INVENTION

In an optical transmission system a loss of input signal alarm is an important tool for determining that an optical cable has been broken, removed, or introduces a high loss.

Improvements in optical transmission methods have vastly enhanced the use of the optical communication systems by increasing both the data rates and the distance over which optical signals are transmitted. Erbium doped optical amplifier (EDFA), one of the latest components in photonic systems, replaces the regenerator (repeater) in many applications. An optical amplifier can amplify optical signals without optically demultiplexing them, thereby avoiding the costs of multiple optical receivers, multiple regeneration circuits and multiple optical transmitters. One of the major advantages of optical amplifiers is that they amplify whatever bit rate comes down the fiber. Even if the transmission rate is boosted, the device will not need to be replaced.

On the other hand, there are no error counts possible between optical amplifiers and therefore isolating the cause of a degraded error rate is not a simple task. Consequently, there is a need to provide a method and apparatus for troubleshooting a chain of optical line amplifiers, where no parity error counts are available.

In optical amplified systems, the reflection of a significant portion of the light leaving via a given fiber may cause problems with detection of the loss of the input signal on that fiber. If the reflected outgoing light could be distinguished from the desired input signal, then appropriate alarms or control actions could be initiated. The outgoing light, that is then reflected, could be amplified signal and amplified spontaneous emission (ASE), as in the case of a bi-directional system, or could be just ASE, as in the case of a unidirectional system. Or, the outgoing light could be a combination of signals and ASE from both directions in the case where there are more complex optical path reflections.

Especially in bi-directional optical amplifier applications, reflections can cause an optical amplifier to oscillate despite the optical isolators that may be present. This oscillation path can involve more than one optical amplifier in the system and be quite complex.

Measurement of the strength of reflections is presently done with an optical time domain reflectometer (OTDR) that sends strong short pulses of light down a fiber and measures the signal returned. This is an accurate method, but the OTDR is a relatively large and expensive piece of test equipment that can not easily be used while there is traffic on the fiber.

Optical frequency domain reflectometry may also be used to detect faults in an optical link. According to this method, the optical frequency is varied and optically coherent detection is used (IEEE Photonics Technology Letters, Vol. 2, No. 12, pp. 902–904, December 1990), or an optical source is modulated with a constant amplitude tone that is swept in frequency (Applied Optics, vol. 20 no 10, pp. 1840–1844, 1981).

Another method for detecting a fault in an optically amplified system is to use a correlation of a specifically generated pseudo-random pulse sequence for reducing peak power requirements (Applied Optics, Vol. 22, No. 23, pp. 3680–3681, 1983).

Still another prior art method is to measure the amount of DC light reflected back via a four port coupler. However, this method does not stimulate or consider the AC portion of the signals. The DC reflection is used to determine if a large reflection from a broken fiber or open connector is present so as to shut-down the output of the optical amplifier for safety. In addition, this has been known to falsely trigger from low level reflection due to Raleigh scattering in the fiber. This method cannot be used in bidirectional systems.

There is a need to provide a means for detecting errors in a transmission system irrespective if a data signal is present or absent. There is also a need to distinguish optical reflections from valid inputs when isolating a cable break in an optically amplified system.

SUMMARY OF THE INVENTION

It is an object of the present invention to provide methods and apparatus for monitoring performance of optical transmission systems which minimize or overcome some or all of the above problems.

It is another object of the present invention to provide a system and a method for distinguishing reflections or oscillations of an optically amplified transmission system from normal operation of the system.

Still another object of the present invention is to provide an inexpensive means for detecting reflections or oscillations in an optically amplified system which operates with or without a data signal being present. Distinguishing optical reflections from valid inputs is important when isolating, for example, cable breaks in an optically amplified system.

Accordingly, the invention is directed to an apparatus for detecting a fault at an optical amplifier module of a transmission system, comprising, means for modulating a laser of the optical amplifier module with a local dither, means for measuring an outgoing optical signal of the optical amplifier module to obtain a transmitted dither, means for measuring an incoming optical signal of the optical amplifier module for detecting a received dither, and means for processing the received dither and the transmitted dither for determining the ratio of the energy in the received dither to the energy in the transmitted dither, indicating if the local dither is present in the incoming optical signal.

The invention is further directed to an optical transmission system with a plurality (N) of optical amplifiers, an apparatus for detecting a fault at each amplifier $A_i$ ($i \in [1,N]$) comprising, means for modulating a laser of the optical amplifier $A_i$ with a local dither $D_{ij}$ unique to the transmission system, means for measuring an outgoing optical signal to provide a respective transmitted dither $D_{oi}$, means for measuring a respective incoming optical signal for detecting a respective received dither $D_{ii}$, and means for processing the respective received dither $D_{ii}$ and the respective transmitted dither $D_{oi}$ for determining the ratio of the energy in the respective received dither to the energy in the respective transmitted dither to detect if any local dither $D_{fj}$ is present in the received dither $D_{ij}$, where f designates the amplifier $A_i$ and any other amplifier connected in the transmission system downstream from the amplifier $A_i$.

The invention further includes a method for monitoring the performance of an optical amplifier module of a transmission system comprising the steps of, generating at the optical amplifier module a local dither, modulating the bias current of an optical source of the optical amplifier module with the local dither, measuring an outgoing optical signal of the amplifier module to provide a transmitted dither, measuring an incoming optical signal of the amplifier module for detecting a received dither, and determining the ratio of energy in the received dither to the energy in the transmitted dither for tracking-down the local dither in the incoming optical signal.

There is further provided a method for monitoring the performance of a WDM optical transmission system comprising the steps of, at each optical amplifier $A_i$ (i$\in$[1, N]) of the transmission system, generating a local dither $D_{ij}$ (i $\in$[1, N], (i$\in$[1, M]) of a known energy, for identification of the optical amplifier and of a transmission channel, modulating the bias current of a laser of the transmission channel with the local dither to mix an outgoing signal with the local dither, measuring an incoming optical signal for detecting a received dither $D_{ii}$, measuring the outgoing optical signal for detecting a transmitted dither $D_{oj}$, calculating the ratio of energy in the received local dither to the energy in the transmitted dither, and determining if a local dither $D_{fj}$ is present in the incoming optical signal, where f designates the amplifier $A_i$ and any amplifier connected in the transmission system downstream from the amplifier $A_i$.

Advantageously, the present invention provides a method and apparatus which is an inexpensive addition to an optical amplifier module and gives a good accuracy in identifying the magnitude of optical reflections. Being built into the equipment, it does not significantly disturb the traffic, and can be continuously or remotely monitored.

DETAILED DESCRIPTION OF THE PREFERRED EMBODIMENT

This invention uses a low frequency modulation (dither) of the optical power being transmitted by an optical amplifier as a test signal. Performance of transmission systems using optical amplifiers must be monitored so that faults in the operation of the system can be isolated to faulty EFDAs or terminals, and maintenance personnel can be dispatched to the appropriate location with pertinent information and equipment to correct that fault.

The device and method according to this invention are provided for detecting reflections by selecting a local code, modulating the laser of the respective amplifier with the local code, and attempting to detect the local code on the amplifier input(s). The dither is thus used as a test signal for monitoring the operation of the respective amplifier, irrespective if information signals are present or not. To this end, the optical signal is tapped at the optical amplifier for measuring the input and output power of the optical signal. The measurement is then used for adjusting the output power by controlling the laser current, or for declaring loss of signal and initiating the corresponding alarms.

The method and apparatus of the invention use the power monitors that are generally present in optical amplifiers for monitoring the received and transmitted signals to determine the energy of the transmitted signal. Provisions are made for measuring the ratio of the energy in the dither present in the incoming optical signal to the dither energy in the transmitted dither. This ratio is also that of the reflected signal power to the transmitted signal power.

Figure 1:
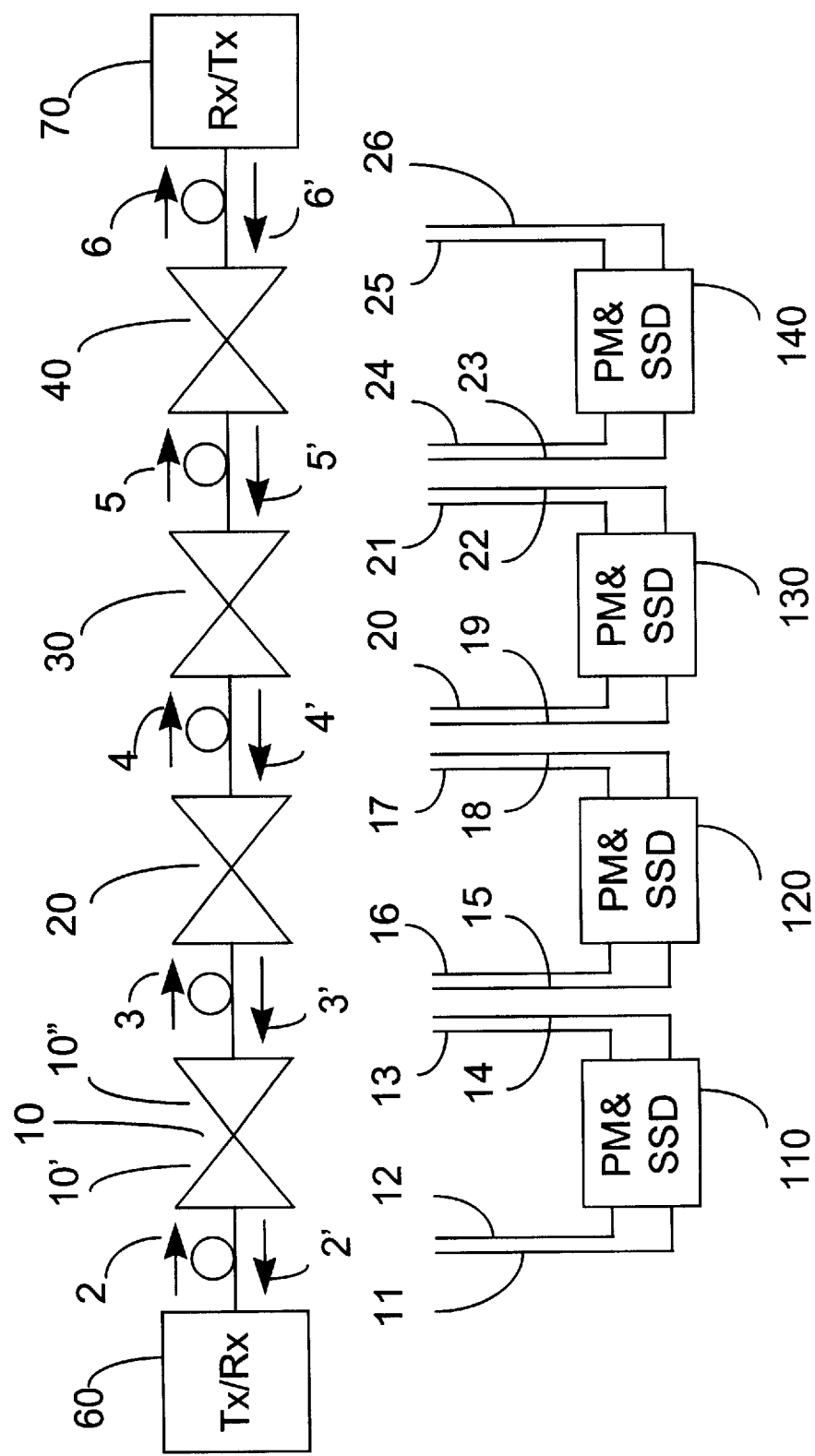
FIG. 1 illustrates a transmission system with a plurality of bi-directional line amplifiers equipped with self-stimulation signal detection units of the invention.

FIG. 1 illustrates a transmission system with a plurality of bi-directional line amplifiers equipped with power monitor and self-stimulation signal detection units of the invention.

Four bi-directional line amplifiers 10, 20, 30 and 40 are connected on an optical fiber link between the terminal 60 (a transmitter/receiver) and terminal 70 (a receiver/transmitter). In optical systems with bi-directional amplifiers as illustrated in FIG. 1, signals are present in different optical wavelength in both directions, namely from the transmitter of terminal 60 to the receiver of terminal 70 and from the transmitter of terminal 70 to the receiver of terminal 60. A similar block diagram is applicable for unidirectional amplifiers, where only one incoming optical signal and one outgoing optical signal are to be considered.

Each amplifier is equipped with a power monitoring and self-stimulation signal detection unit (PM & SSD) 110, 120, 130 or 140, respectively. Each unit 110, 120, 130 and 140, generates a local code $C_{ij}$, which is unique to the respective amplifier. Index "i" defines the amplifier and is an integer taking values between 1 and N, where N is the total number of amplifiers in the optical transmission link. N=4 in the embodiment illustrated in FIG. 1. Index "j" defines the code, and is an integer taking values between 1 and M, where M is the total number of codes available for the optical transmission link. M=6 in the embodiment of FIG. 1. It will be explained later why the number M of codes available is greater that the number of amplifiers N.

A low frequency dither signal $D_{ij}$ is formed at each amplifier using the local codes $C_{ij}$ which encode the intensity of the light of the laser pump with a known modulation depth. The codes are selected so that they do not interfere with the codes transmitted by the neighboring amplifiers and are thus separately measurable. For example, the codes may be selected to be phase independent orthogonal to each other. In this way, the step of detecting the input dither $D_{Ii}$ and the output dither $D_{Oi}$ at each optical amplifier $A_i$ comprises decoding the modulation depth of the dither signal in the incoming and outgoing signals, respectively.

PM & SSD unit 110 directly modulates the laser of amplifier 10 so that outgoing signals 2' and 3 are modulated with a dither $D_{1j}$, where j$\in$[1,M]. Similarly, outgoing signals 3' and 4 of amplifier 20 are modulated with dither $D_{2j}$ generated by unit 120, where $D_{2j} \neq D_{1j}$; outgoing signals 4' and 5 of amplifier 30 are modulated with dither $D_{3j}$ generated with unit 130, where $D_{3j} \neq D_{1j}$ and $D_{3j} \neq D_{2j}$; and outgoing signals 5' and 6 of amplifier 40 are modulated with dither $D_{4j}$ generated by unit 140, where $D_{4j} \neq D_{1j}$, $D_{4j} \neq D_{2j}$, and $D_{4j} \neq D_{1j}$. Alternatively, it is possible to modulate other lasers present in the amplifier.

At amplifier 10, a fraction of each of the incoming signals 2 and 3' for the respective direction of transmission is diverted to PM & SSD unit 110 as input signals 11 and 13, respectively, while a fraction of outgoing signals 2' and 3 is diverted as output signals 12 and 14. PM & SSD unit 110 measures the dither signal $D_{f1}$ that may be present in the optical incoming signals 2 and 3' for the respective direction of transmission, to detect the local code $C_{ij}$. Dither signal $D_{f1}$ may comprise dithers from the amplifiers connected upstream from the amplifier under consideration. In this example, no dither should be detected by unit 110 in the incoming optical signal 2 transmitted from terminal 60 to terminal 70, while the dithers transmitted by amplifiers 20, 30 and 40 may be detected in the incoming optical signal 3' traveling from terminal 70 to terminal 60. If a reflection has occurred in the direction 60 to 70, unit 110 will detect the locally generated code $C_{1j}$ in the incoming signal 11. The ratio of the energy in the dither $D_{f1}$ detected in the incoming signal and the energy in the transmitted dither $D_{1j}$ gives the value of reflection.

Similarly, a fraction of each of the incoming optical signals 3 and 4' is diverted at amplifier 20 as input signals 15 and 17, and applied to unit 120. A fraction of the outgoing optical signals 3' and 4 is also diverted as output signals 16 and 18, and input to PM & SSD unit 120. Unit 120 measures the dither $D_{f2}$ present in the incoming signals and determines if its own code $C_{2j}$ is present. The ratio of the energy in the received dither $D_{f2}$ and the energy in the transmitted dither $D_{2j}$ gives the value of reflection.

The majority of optical amplifiers currently in use are equipped with power monitors. A brief description of some of the functions of the power monitors which are of interest to this invention will be given in connection to FIG. 2.

Figure 2:
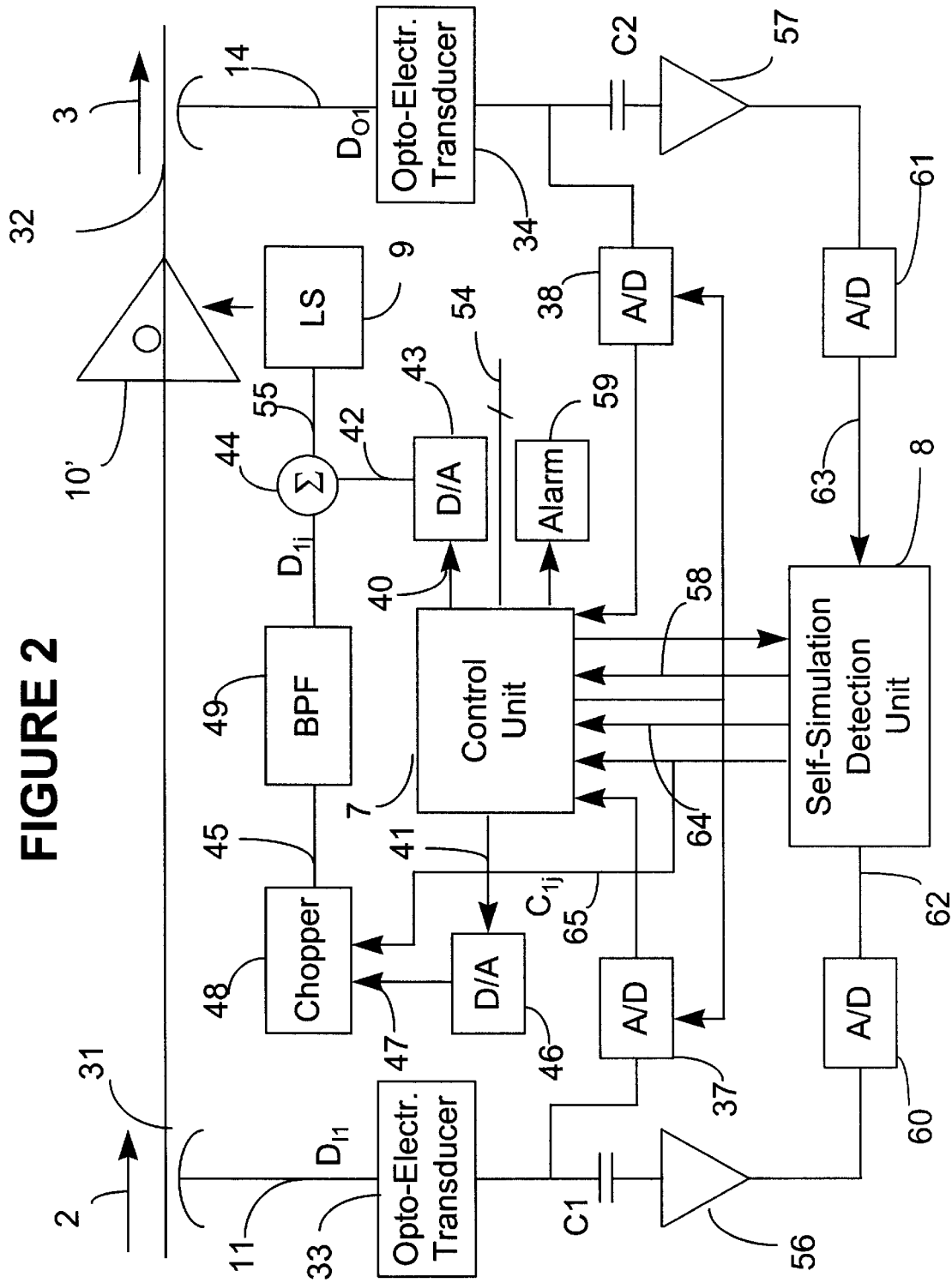
FIG. 2 shows the connection of a self-stimulation signal detection unit with the power monitoring blocks of a unidirectional optical amplifier.

FIG. 2 shows the block diagram of optical amplifier 10' equipped with PM & SSD unit 110. Only the blocks pertaining to one direction of transmission, namely from transmitter of terminal 60 to receiver of terminal 70 are illustrated in FIG. 2 for simplification.

As indicated above, fractions of the optical incoming and outgoing signals 2 and 3 are tapped at an optical amplifier and the transmission system parameters are measured for both tapped portions of the optical signal.

Input optical tap 31 removes a 3–5% input fraction 11 from the incoming optical signal 2 and output optical tap 32 removes a 3–5% output fraction 14 from the outgoing optical signal 3. For an amplifier $A_i$, the input fraction comprises an input dither signal $D_{Ii}$ and the output fraction comprises an output dither signal $D_{Oi}$. In case of normal functioning, the output dither will include a local dither $D_{ij}$ which is added to the input dither $D_{Ii}$. If the local dither is detected in the input fraction, this is interpreted by the PM & SSD unit of this invention as a reflection.

Each of the input and output fractions is converted to an electrical signal by a respective opto-electronic converter 33 and 34. Each converter 33 or 34 generally comprises a PIN photodiode and a trans-impedance amplifier (not shown). The PIN diode converts the incident light into an electrical current which is amplified and band limited between 0 and 1 kHz by the trans-impedance amplifiers. The analog signals obtained at the output of opto-electronic converters 33 and 34 are a measure of the incoming optical signal 2 and outgoing optical signal 3. They are respectively converted to digital signals by two slow analog to digital (A/D) converters 37 and 38 that simultaneously sample the levels of the analog signals at their inputs and pass the resulting data signals to an on-board control unit 7 to process. The control unit 7 processes these digital signals to produce control signals 40 and 41.

The first control signal 40 is obtained in control unit 7 by comparing the estimated total power of the tapped optical incoming and outgoing signals. Control signal 40 is converted to an analog power control signal 42 with digital-to-analog converter 43. Power control signal 42 is applied to a first input of summing circuit 44 for setting the operating point of the laser. The local dither $D_{ij}$ ($D_{1j}$ in the embodiment illustrated in FIG. 2) is applied to a second input of the summing circuit 44.

The amplitude of the local dither is precisely controlled with signal 41 which determines the dither modulation depth. The amplitude chosen is a trade-off between improved accuracy obtained with larger amplitudes and less transmission system impairment obtained with smaller amplitudes. Digital to analog converter 46 receives the second control signal 41 and converts signal 41 into a modulation level signal 47 which is applied to chopper 48. Chopper 48 also receives a local code $C_{ij}$ ($C_{1j}$ in the embodiment illustrated in FIG. 2) supplied by the SSD unit 8 on line 65 and accordingly modulates the analog control signal 47 with the local code. The modulated signal 45 is applied to a band pass filter 49 which limits the band of the modulation to produce the local dither $D_{ij}$ ($D_{1j}$ in FIG. 2). The low frequency locally generated dither is mixed in unit 44 with power control signal 42 and the resulting signal 55 is applied to laser source 9.

As indicated above, the low frequency modulation $D_{ij}$ generated by each amplifier $A_i$ should be always uncorrelated to the dithers from any other amplifier, data source, control circuit, or other dither. The dither $D_{ij}$ is obtained using a local code $C_{ij}$ generated in the self-stimulation signal detection unit 8 so as to be unique to the transmission system as indicated above.

Amplifiers 56 and 57 are provided for the AC component of the voltage of the incoming and outgoing signals. They are followed by the analog to digital converters 60 and 61 which convert the analog output of these amplifiers to digital signals 62 and 63 that are transmitted to SSD unit 8.

The first and second digital signals 62 and 63 are used for adjusting the amplitude modulation of the local dither $D_{ij}$, for selecting the local code $C_{ij}$, and for diagnosis and isolation of faults.

Whenever the local dither is detected in the received dither, SSD 8 alarms control unit 7 by issuing a fault signal 58, and the control unit triggers alarm block 59. The control unit also monitors the operation of the SSD 8. Data measured by the control unit 7 as well as the fault signals may be transmitted to a remote monitoring unit at one of the optical terminals and control signals may be received via remote monitoring bus 54.

Figure 3:
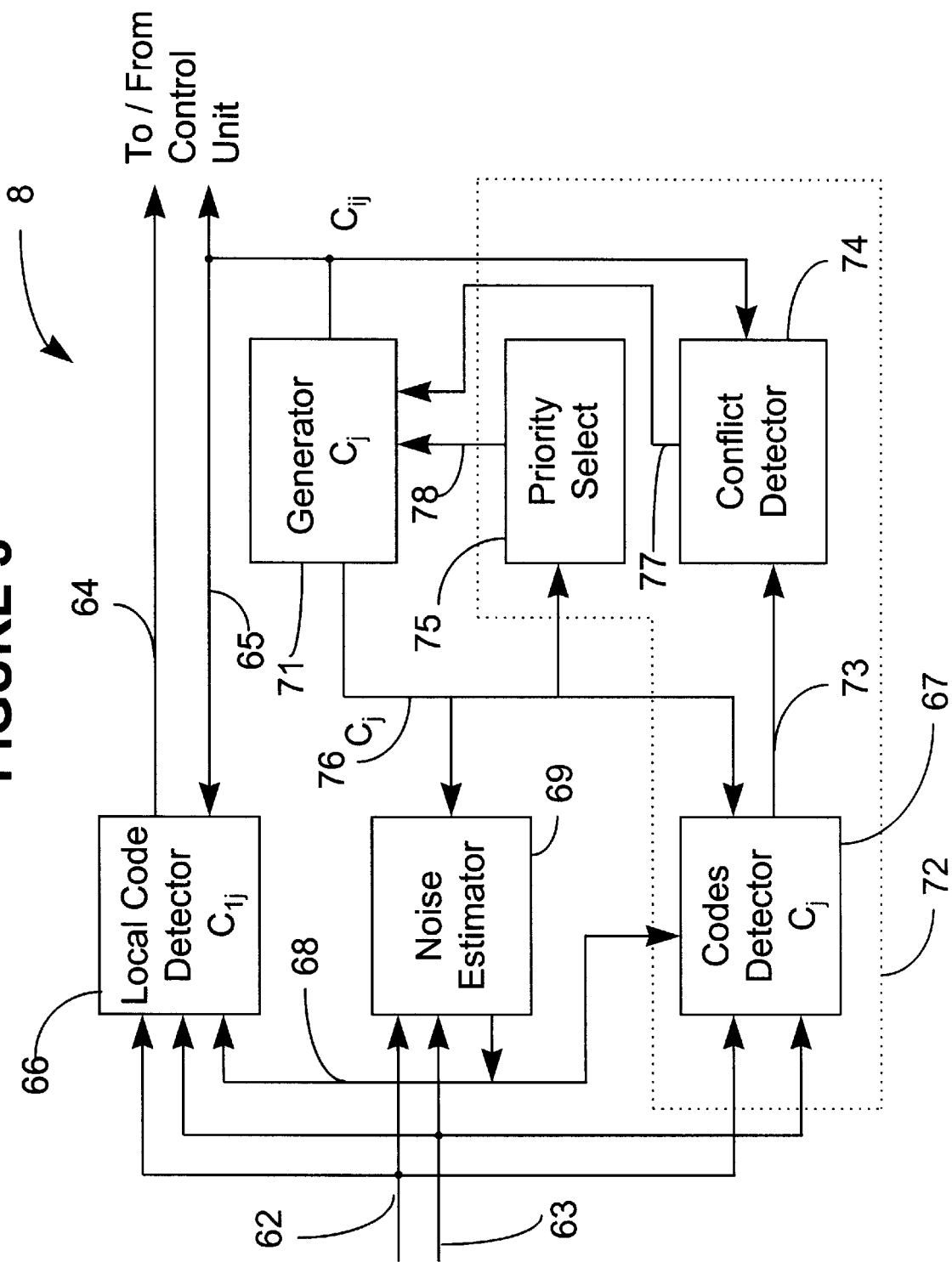
FIG. 3 shows the block diagram of a self-stimulation signal detection unit.

FIG. 3 shows a block diagram of the SSD unit 8 of amplifier 10', according to one embodiment of this invention. In FIG. 3, $C_{1j}$ is the local code, and $C_j$ designates any of the codes available for the transmission system.

At each amplifier, a code generator 71 generates codes $C_j$, which are used for detecting the codes present in the input and output dither signals $D_{Ii}$ and $D_{Oi}$, or, more precisely, in the first and second digital signals, respectively.

Choosing local code $C_{ij}$ is an important decision, having in view the constrains imposed to this signal. The code must not impair the transmission system, should be out of band for easy detection of the information on the link, and the neighboring amplifiers codes should not interfere with each-other. Another requirement for this signal is to be selected such as to allow for an easy detection. This implies that the power of the code be constant and precisely determined so as to easily distinguish it over the noise.

As indicated above, codes that do not interfere with the codes transmitted by the other amplifiers in the link may be codes which are phase independent orthogonal to each other. Phase independent orthogonality implies that the components of the frequency spectrum of a code occur at different frequencies than those of the other code. For example, if the circuit includes four optical amplifiers 10, 20, 30 and 40 as illustrated in FIG. 1, the initial codes $C_j$ chosen are 50% duty cycle square waves of the following periods: $T_{C1}$=12 ms, $T_{C2}$=16 ms, $T_{C3}$=18 ms, $T_{C4}$=24 ms and $T_{C5}$=32 ms. They will be measured in a master period $T_S$ of 288 ms in which all five codes have an integer number of periods.

As well, a random number unique to the amplifier may be used as the local code.

The SSD unit 8 comprises code detector 66 for attempting to detect the local code in the first and second digital signals 62 and 63, and a noise estimator 69 for setting a noise threshold 68 for decisions regarding the presence of the codes in signals 62 and 63.

The local code detector 66 detects the measured code $C_{1j}$ in the second (output) signal 63 and applies this signal to the control unit 7 as a code present signal 64. Signal 64 is compared to the estimated total power of the tapped outgoing optical signal to produce the modulation level signal 41. The measured modulation depth of the code $C_{ij}$ measured in the digital signal 63 is also compared with the known modulation depth of the local code to estimate the signal and noise components of the optical outgoing signal.

The measured code $C_{1j}$ is detected using straight forward correlation detection. The decision threshold signal 68 generated with noise estimator block 69 is used for separating the detected code from the noise.

More importantly, the local code detector 66 attempts to detect the local code $C_{1j}$ in the input signal 62, while SSD unit 8 transmits this code. If the local code is detected in the first signal 62, this is perceived as a reflection and the control unit and remote monitors are alerted of this faulty situation by alarm block 59.

SSD unit 8 also comprises a code selection unit 72 which is used for selecting the local code for amplifier 10' to transmit from the plurality of codes available for the respective transmission system. Code selection unit 72 comprises a codes detector 67, a conflict detector 74 and a priority select block 75.

The codes detector 67 measures the codes present in the first and second signals 62 and 63, using the codes signal 76, and produces a codes present signal 66. Detector 67 is a bank of filters matched to each orthogonal code $C_j$. The decision threshold signal 68 is used by the code detector 67 for pulling the codes out of the noise.

Conflict detection unit 74 is used to determine if the local code $C_{ij}$ transmitted by amplifier $A_i$ conflicts with any other code transmitted by the other amplifiers in the link. Conflict detection unit 74 compares the local code $C_{ij}$ with the codes present signal 73 and changes the local code if a code conflict is detected, using code change signal 77. Priority select block 75 receives the codes signal 76 from the generator 71 and instructs the generator to select the local code based on a priority scheme. Preferably, the amplifier closest to terminal 70 will transmit the highest priority code in the link and the amplifier closest to the terminal 60 will transmit the lowest priority code in the link.

The SSD unit of this invention operates in two distinct modes, namely the code selection mode and reflection detection mode. The code selection mode is initiated when the amplifier is powered on. This mode involves detecting the codes present in signals 62 and 63, initial selection and transmission of a local code $C_{ij}$, code resolution when a code conflict exists and finally, selecting a local code for the reflection detection mode. After the local code has been selected, the reflection detection mode is initiated, and the presence of reflections is detected. Concurrently, a periodical check to determine whether the local code is uncorrelated to any other code present in the link is also effected at random moments.

Code Selection Mode

Figure 4:
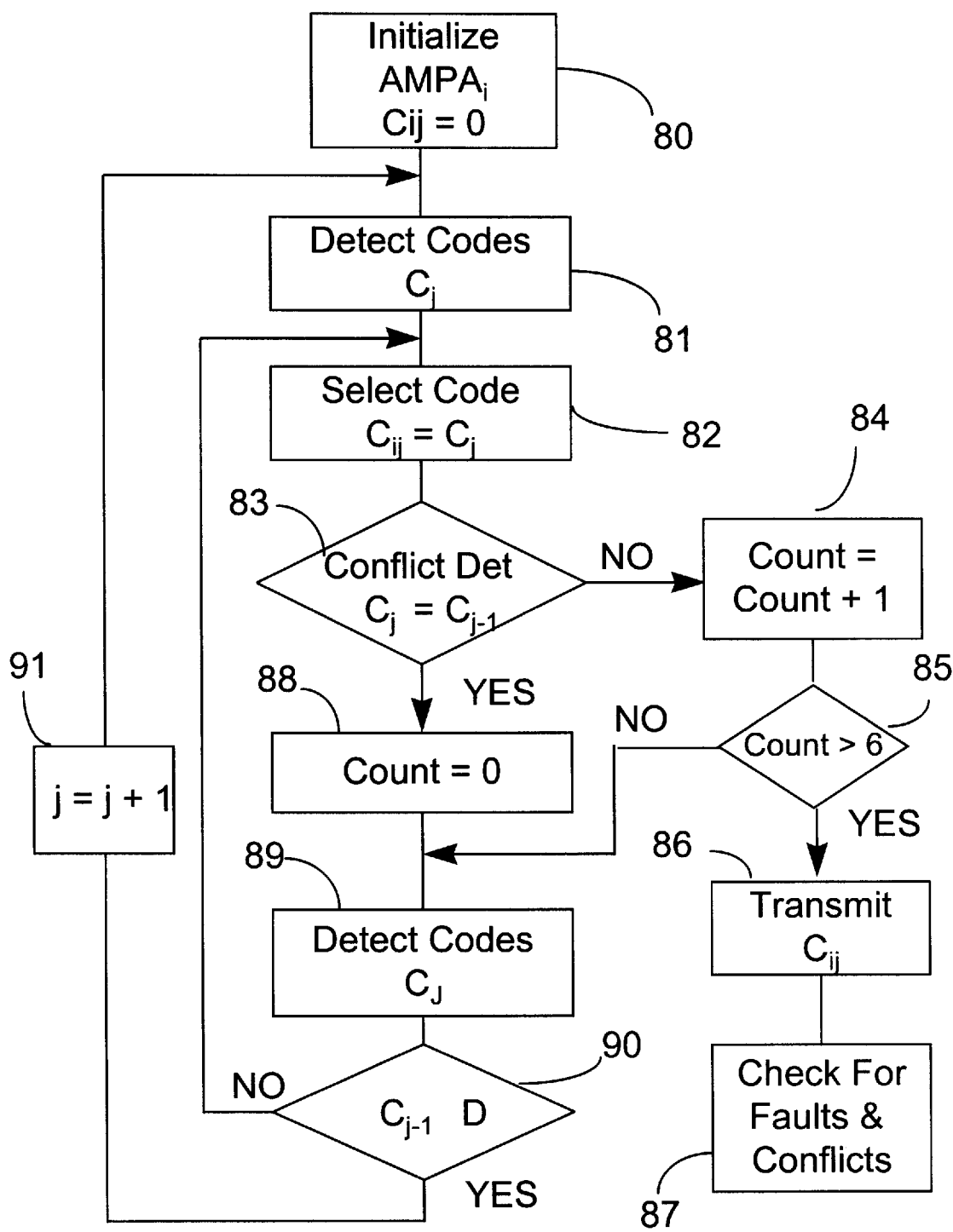
FIG. 4 shows a flow-chart for a method of selecting and assigning a local code to an optical amplifier.

The code selection mode will be described in connection with FIGS. 3 and 4. FIG. 4 illustrates a flowchart of the code selection method when the output of each amplifier in the link is dithered with a different code.

An initial selection takes place at each amplifier when it is powered on, followed by a conflict detection for verifying if it is the only amplifier transmitting the code initially selected.

As indicated above, the codes detector 67 detects the codes in the first and second digital signals 62 and 63 while code generator 71 does not transmit any code. Generator 71 selects a local code $C_{1j}$ based on this measurement.

Initial Code Selection

Firstly, the generator 71 selects a code $C_{1j}$ for the amplifier 10, out of codes $C_j$ that may be generated by it. This operation is executed whenever the amplifier is powered on or reset.

First, the amplifier $A_i$ executes its standard initialization in step 80 and the SSD unit 8 is reset so that no code is output on terminal 65, as indicated by $C_{ij}$=0. Code detector unit 67 receives all codes $C_j$ on line 75 and the input and output signals 62 and 63 and detects the codes that are present in these signals, in step 81. This involves correlating for each M orthogonal codes. One sampling period of data is collected to this end, with no dither being transmitted. Correlation will be done on this sample with all codes.

Then, in step 82, generator 71 selects a code $C_{ij}$ for amplifier $A_i$ to transmit based on priority signal 78, so that $C_{ij}$ does not conflict with any of the codes transmitted by the other amplifiers in the link.

Code Conflict Detection

After the initial code selection is complete, on-line detection of code conflicts is performed in conflict detector block 74, so that any conflicts are resolved by selecting a new local code for the amplifier under consideration. It is possible that a code conflict may exist, even after the initial selection has been made based on the codes transmitted by the other amplifiers. This could occur due to several different mechanisms, but should be generally infrequent. The presence of the local dither may cause code conflicts with other amplifiers in the link, resulting in code shuffling on some or all of the amplifiers in the link. To accommodate this shuffling, each SSD unit will continue the code selection until six trials have been elapsed in which it was not required to change the code.

If a conflict exists, conflict detector 74 receives the local code signal 65 and the codes present signal 66. The conflict detector unit 74 will detect the local code $C_j$ in the signal 73 and will instruct the generator 71 to change the local code through code change signal 77.

The SSD unit checks if the code initially selected has been changed in step 83, and if not ($C_j$=$C_{j-1}$), a counter COUNT is incremented for counting up to six trials in step 84. When six trials were performed during which the code selection unit was not required to change the code, as shown in step 85, the amplifier $A_i$ will transmits its code $C_{ij}$ (step 86) for reflection detection (step 87).

If in step 83 it is detected that code $C_{ij}$ was changed, the counter is reset in step 88. This implies that after a code change, six trials should be again run, so as to account for code shuffling. The dither is measured in step 89 to detect all codes present, in step 90 the code detector 69 checks if the local code $C_{ij}$ is present at its inputs and if not, same code $C_{ij}$ is maintained and six trials are performed as discussed above. If $C_{ij}$ is detected in the codes present signal 66, a new code $C_{i,j+1}$ is selected by priority select block 75 in step 91, the dither is again measured and the steps shown in FIG. 4 are executed as described above.

There is a potential for a problem if synchronization between amplifiers exists. For example, if two or more amplifiers are transmitting the same code and they discontinue transmission at the same time, an eventual code conflict will never be detected and an incorrect code selection would be made. To prevent this potential synchronization problem from occurring, the dither is measured in step 89 for a random length interval of between 12 and 44 master sample periods. The probability of synchronization existing through six iterations is:

$$\left[\frac{1}{(44-12)}\right]^6 = \left(\frac{1}{32}\right)^6 = 9.31 \cdot 10^{-10}$$

This probability is acceptably low. If synchronization exists after six iterations, and a code conflict exists, the conflict detector will detect it and the situation will be rectified.

Following this, SSD will begin detecting if any reflected signal is present at its inputs, along with checking randomly for code conflict.

Selection Of Codes Priority

The generator 71 selects the code $C_{ij}$ on a basis of a priority scheme, which will be explained in the following in connection with FIGS. 1 and 5. Amplifier 40 closest to receiver/transmitter 70 will transmit the highest priority code on the link, while amplifier 10 closest to transmitter/receiver 60 will receive the lowest priority code in the link. Once the initial code selection is complete, the amplifier will begin to transmit its code. This process will repeat at random intervals, allowing for the fact that some code shuffling between amplifiers may occur initially.

The priority of the codes is implemented preferably in a circular fashion to minimize the amount of code shuffling among the amplifiers in the link. Where, for example, the three amplifiers closest to the transmitter/receiver 60, 10, 20 and 30 have selected codes correctly, the fourth amplifier 40, closest to the receiver/transmitter 70 was the last amplifier in the link powered on, and hence the last amplifier trying to perform code selection. Table 1 illustrate this case.

TABLE 1

| Amplifier | $A_1$ (10) | $A_2$ (20) | $A_3$ (30) | $A_4$ (40) |
|---|---|---|---|---|
| Code k (k = j − 1) | 2 | 1 | 0 | |
| Time $T_1$ | 2 | 1 | 0 | 0 |
| Time $T_2$ | 2 | 1 | 1 | 0 |
| Time $T_3$ | 2 | 2 | 1 | 0 |
| Time $T_4$ | 2 | 2 | 1 | 0 |
| Time $T_5$ | 3 | 2 | 1 | 0 |
| OR | | | | |
| Time $T_1$ | 2 | 1 | 0 | 4 |

Normally priority "0" (j=1) is the highest priority and "4" (j=5) is the lowest. If this was adhered to rigidly and a circular priority scheme was not used, amplifiers 10, 20 and 30 would all be required to change codes. Amplifier 40 would measure code $C_1$ with priority "0" in $T_1$, amplifier 20 would detect its conflict with amplifier 10 in $T_2$ and decrement its code. Then amplifier 30 would detect its conflict with 20 in $T_3$, and so on. However, with circular priorities, code $C_5$ of amplifier 40 becomes higher priority than code $C_1$ of amplifier 30 and no shuffling is required. Thus, the fifth code can be used for expediting the initial code shuffling.

Figure 5:
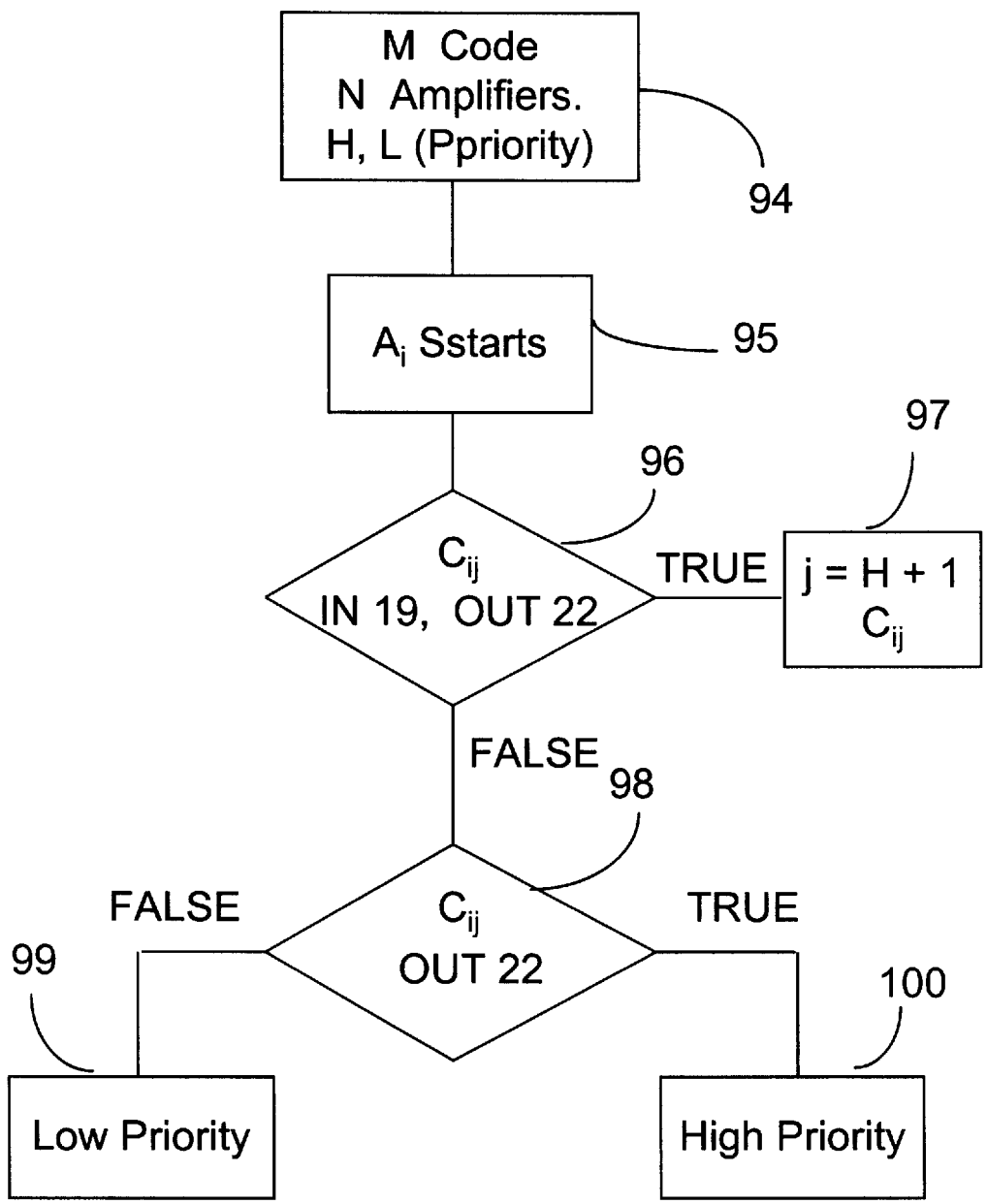
FIG. 5 illustrates a flowchart of a method for assigning priorities.

A pseudocode description of this method is illustrated in FIG. 5. FIG. 5 illustrates how a SSD unit selects the code to be transmitted according to the "low priority" or "high priority" routine.

In step 95 amplifier 30, for example, is initialized and begins code selection. The code detection unit 72 of the amplifier checks if any code $C_{ij}$ is received at input 19 and output 22 in step 96. If no code is detected, this means that amplifier 30 is the first amplifier which is ready to select its code. Code $C_1$ with the priority "0" is selected in step 97. If in step 98 amplifier 30 detects a code in the second digital signal (output), this means that downstream amplifier 40 has been initialized before amplifier 30, and already transmits its code. The code transmitted by unit 40 should have a higher priority than that of unit 30, and a "high priority" routine is executed in step 100. If in step 98 amplifier 30 detects a code in the first digital signal (input), this means that upstream amplifiers 10 or/and 20 have been initialized before amplifier 30, and already transmit their codes. The code transmitted by units 10 and 20 should have a lower priority than that of unit 30, and a "low priority" routine is executed in step 99.

The following example illustrates how priority is attributed to the last two codes which are not yet transmitted by any amplifier.

| Code | Present | Priority |
|---|---|---|
| 1 | True | |
| 2 | True | |
| 3 | False | High |
| 4 | False | Low |
| 5 | True | |

The "high priority" routine selects the highest priority code using a circular scheme. This code is always the first free code, after the first unused code, searching from 0 to 4. If a code $C_4$ is reached in the search, the routine will wrap around and continue searching at code 0. The following example illustrates this case.

| Code | Present | Priority |
|---|---|---|
| 1 | False | High |
| 2 | False | |
| 3 | False | |
| 4 | False | Low |
| 5 | True | |

The "low priority" routine selects the highest priority code in a similar fashion. This code is always the first free code, after the first unused code, searching in reverse from 4 to 0. If a code $C_0$ is reached in the reverse search, the routine will wrap around and continue searching at code $C_4$. The following example illustrates this case.

| Code | Present | Priority |
| --- | --- | --- |
| 1 | True | |
| 2 | False | High |
| 3 | False | |
| 4 | False | |
| 5 | False | Low |

As discussed above, there is a potential for a problem if synchronization between amplifiers exists. To prevent this potential problem, generator 71 disables the local code output by block 71 and initiates detection of codes present. The detection of codes on inputs 62 and 63 is performed for between 12 and 44 master sample periods.

Reflection Detection Mode

This involves monitoring the presence of reflections as well as periodically checking whether the local code is uncorrelated to any other code present in the transmission system.

It is important that a fault be declared quickly in the detection mode. The reflection detection mode has a faster response time than the change of a local code in the code selection mode, for more accurate measurement of reflections. The minimum reflection detectable can be preset by modifying the noise threshold signal.

Conflict detection unit 74 checks for eventual conflicts at random intervals. The code generator 71 will discontinue transmission of the code $C_{ij}$ for a short period and the unit will attempt to detect the same code in the first and second digital 62 and 63. As in the case of the initial selection of the local code, if the code is present when the code generator is not transmitting, a code conflict exists. To resolve this conflict, conflict detection unit instructs generator 71 on line 77 to change the local code and so on, as explained above.

Figure 6:
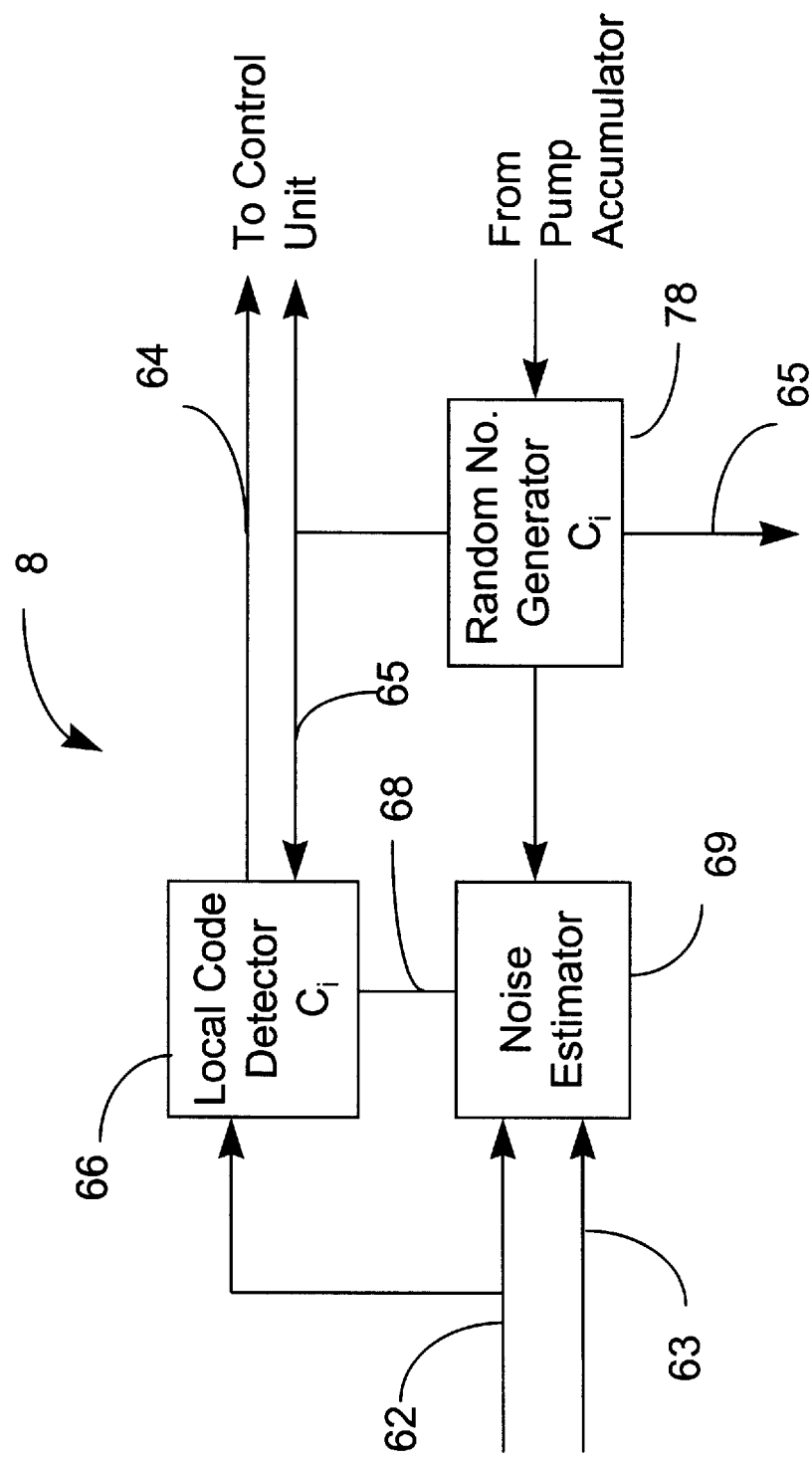
FIG. 6 illustrates the block diagram of a self-stimulation detection unit according to another embodiment.

FIG. 6 shows the block diagram for another embodiment of SSD unit 8. The local code $C_i$ is generated in the random number generator 78 using for example the last significant digits from the pump accumulator. The local code is then applied to laser source 9 using chopper 48, band pass filter 49, and summing circuit 44, as in the case of orthogonal codes $C_{ij}$. The light emitted by the laser is dithered with this low frequency signal that is an independent function of the respective amplifier.

This dither $D_i$ is applied at random moments and allows detection of a reflection when the information is present or not. The SSD unit 8 comprises code detector block 66 and noise estimator block 69. For detecting eventual reflections, the first digital signal 62 and the second digital signal 63 are applied to the noise estimator 69 and code detector 66. The local code $C_i$ is first pulled out from the noise by correlating over 256 samples using noise threshold signal 68. The amount of the code is then used to compute the amount of reflection present and the amount of input actually present in the output signal. If $C_i$ is detected in the $D_{Ii}$, the fault signaling unit 73 alerts the control unit 7, which triggers alarm 59.

Figure 7:
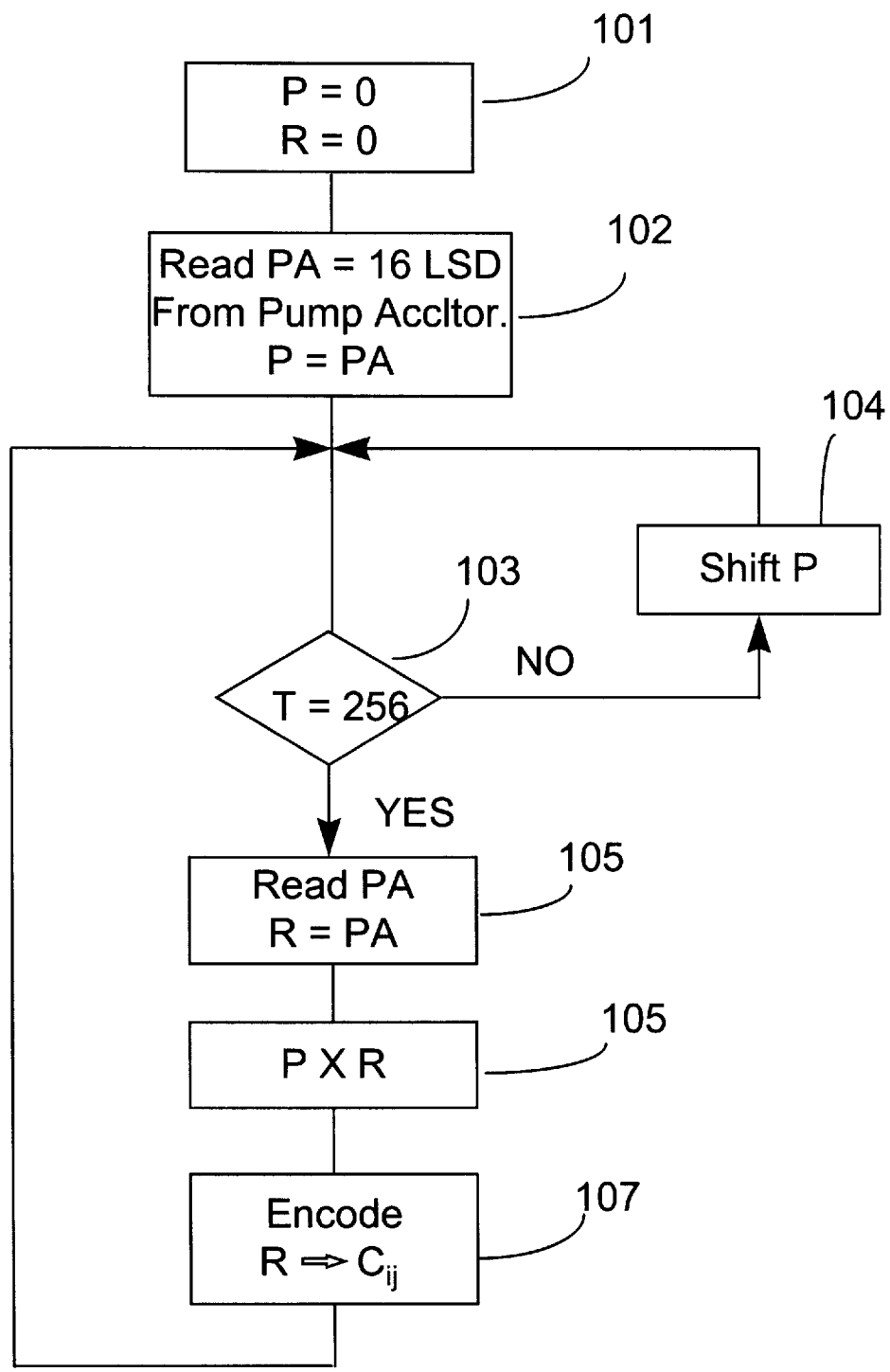
FIG. 7 is a flowchart for the method for generating a local code according to the embodiment of FIG. 6.

FIG. 7 shows how the local code $C_i$ may be generated with the SSD unit 8 of FIG. 6.

In block 101 the amplifier module is initialized and in block 102 the 16 least significant bits (LSB) PA of the 32 bit pump power controller are read in field P. This is a fairly random number as it is strongly influenced by the noise history and the characteristics of the particular pump of that amplifier. This number is the seed to start the random number generator which will then run until the amplifier is reset/powered down.

The number in field P is shifted during an interval T, which is, for example, 256 ms, as illustrated at 104. After period T expires, as detected in block 103, the 16 least significant bits (LSB) PA of the 32 bit pump accumulator are read again in field R in step 105. The number R depends on the current conditions at the pump accumulator, as the current temperature, current level of noise, etc. In step 106, the number in field R is XORed with the number in field P. The output bits of the XOR circuit are then encoded in block 107 to obtain code $C_i$. For example, Manchester encoding may be used, where there is a transition at the middle of each bit period; a low to high transition represents a 1, and a high to low transition represents a 0. This type of encoding is preferable in that the band obtained with the Manchester coding is broad and it does not have any DC component.

This is the code $C_i$ for the next 256 ms, which is unique to the pump accumulator of the respective amplifier and therefore unique to the amplifier $A_i$. As in the case of the previous embodiment described, a modulation of the output signal and noise is used as probe signal, rather than introducing a new optical source to generate a probe. Thus, the device and method of this invention operates with or without a data signal being present.

While the invention has been described with reference to particular example embodiments, further modifications and improvements which will occur to those skilled in the art, may be made within the purview of the appended claims, without departing from the scope of the invention in its broader aspect.

What is claimed is:

1. An apparatus for detecting a fault at an optical amplifier module of a transmission system, comprising:

means for modulating a laser of said optical amplifier module with a local dither;

means for measuring an outgoing optical signal of said optical amplifier module to obtain a transmitted dither;

means for measuring an incoming optical signal of said optical amplifier module for detecting a received dither; and means for processing said received dither and said transmitted dither for determining the ratio of the energy in said received dither to the energy in said transmitted dither, indicating if said local dither is present in said incoming optical signal.

2. In an optical transmission system with a plurality (N) of optical amplifiers, an apparatus for detecting a fault at each amplifier $A_i$ (i∈[1,N]) comprising:

means for modulating a laser of said optical amplifier $A_i$ with a local dither $D_{ij}$ unique to the transmission system;

means for measuring an outgoing optical signal to provide a respective transmitted dither $D_{Oi}$;

means for measuring a respective incoming optical signal for detecting a respective received dither $D_{Ii}$; and means for processing said respective received dither $D_{ij}$ and said respective transmitted dither $D_{Oi}$ for determining the ratio of the energy in said respective received dither to the energy in said respective transmitted dither to detect if any local dither $D_{fj}$ is present in said received dither $D_{Ij}$, where f designates said amplifier $A_i$ and any other amplifier connected in the transmission system downstream from said amplifier $A_i$.

3. A method for monitoring the performance of an optical amplifier module of a transmission system comprising the steps of:

generating at said optical amplifier module a local dither;

modulating the bias current of an optical source of said optical amplifier module with said local dither;

measuring an outgoing optical signal of said amplifier module to provide a transmitted dither;

measuring an incoming optical signal of said amplifier module for detecting a received dither; and determining the ratio of energy in said received dither to the energy in said transmitted dither for tracking-down said local dither in said incoming optical signal.

4. A method as claimed in claim 3, wherein said optical source is a laser for the data communication.

5. A method as claimed in claim 3, wherein said optical source is a laser for the overhead communication.

6. A method as claimed in claim 3, wherein said local dither is a pseudorandom code sequence unique to said optical transmission system.

7. A method as claimed in claim 3, wherein said local dither is a pseudorandom code sequence which is uncorrelated to any other signal in said optical transmission system.

8. A method as claimed in claim 3, wherein said step of measuring said incoming optical signal comprises:

diverting a fraction of said incoming signal;

estimating the energy of noise in said incoming optical signal and accordingly providing a noise threshold;

comparing the amplitude of said received dither to said noise threshold; and estimating the energy of said received dither in said fraction of said incoming signal.

9. A method as claimed in claim 3, wherein said step of measuring said outgoing optical signal comprises:

estimating a measured transmitted dither and a measured total power of said measured outgoing signal;

estimating a signal and a noise component of said measured outgoing signal by comparing the amplitude of said measured transmitted dither to said measured total power;

producing a first control signal dependent of said measured power; and producing a second control signal for controlling the amplitude of said transmitted dither.

10. A method as claimed in claim 9, wherein said step of generating comprises the sub-steps of:

generating a pseudorandom code sequence unique to said optical system with a code generator;

modulating said first control signal with said code for obtaining a dither signal; and filtering said dither signal to obtain a filtered dither signal.

11. A method as claimed in claim 9, wherein said pseudorandom code sequence is obtained by combining the output of a pseudorandom number generator with a symbol sequence that is a function of said amplifier.

12. A method for monitoring the performance of a WDM optical transmission system comprising the steps of:

at each optical amplifier $A_i$ (i∈[1, N]) of said transmission system, generating a local dither $D_{ij}$ (i∈[1, N], ∈[1, M]) of a known energy, for identification of said optical amplifier and of a transmission channel;

modulating the bias current of a laser of said transmission channel with said local dither to mix an outgoing signal with said local dither;

measuring an incoming optical signal for detecting a received dither $D_{Ii}$;

measuring said outgoing optical signal for detecting a transmitted dither $D_{Oi}$;

calculating the ratio of energy in said received local dither to the energy in said transmitted dither; and determining if a local dither $D_{fj}$ is present in said incoming optical signal, where f designates said amplifier $A_i$ and any amplifier connected in said transmission system downstream from said amplifier $A_i$.

13. A method as claimed in claim 12, wherein said local dither has statistics that are substantially independent of all other dithers present in said transmission system.

14. A method as claimed in claim 12, further comprising the step of selecting a local dither $D_{ij}$ out of an given bank of M dither signals $D_j$ (j∈[1, M]) such that said local dither $D_{ij}$ is phase orthogonal with each other local dither $D_{km}$ generated by each other amplifier $A_k$.

15. A method as claimed in claim 14, wherein said step of selecting comprises:

initializing said amplifier $A_i$;

measuring an outgoing optical signal for detecting a transmitted dither $D_{Oi}$ of said amplifier $A_i$;

processing said transmitted and said received dither to determine dithers $D_j$ absent in both said signals; and selecting said local dither $D_{ij}$ out of said absent dithers $D_j$.

16. A method as claimed in claim 15, wherein said steps of measuring said incoming optical signal comprises:

tapping a fraction of said incoming optical signal; and estimating said received dither $D_{Ii}$ in said tapped incoming fraction by correlating said received dither with each of said dithers $D_j$ to obtain a plurality of input picks.

17. A method as claimed in claim 16, wherein said steps of measuring said outgoing optical signal comprises:

tapping a fraction of said outgoing signal; and estimating said transmitted dither $D_{Oi}$ in said tapped outgoing fraction by correlating said transmitted dither with each of said dithers $D_j$ to obtain a plurality of output picks.

18. A method as claimed in claim 16, wherein said step of calculating comprises:

estimating the energy of noise in said incoming and outgoing signals and calculating a noise threshold;

comparing the amplitude of each input pick to said noise threshold to determine if any of said local dithers $D_{ij}$ is present in said incoming signal;

comparing the amplitude of each output pick to said noise threshold to determine if any of said local dithers $D_{ij}$ is present in said outgoing signal; and determining all dithers $D_{ij}$ out of said dithers $D_j$ which are absent in said incoming and outgoing signals.

19. A method as claimed in claim 12, further comprising the steps of:

determining the power of said incoming signal and the power of all said local dithers $D_{fj}$ detected in said incoming optical signal; and calculating the actual power of said incoming signal by subtracting the power of all said local dithers $D_{fj}$ from the power of said incoming signal.

* * * * *